July 31, 1945.     R. E. MIDDLETON     2,380,663
SIMPLIFIED BRAKE VALVE
Filed June 20, 1942     2 Sheets-Sheet 1

RALPH E. MIDDLETON,
INVENTOR

BY
ATTORNEY

July 31, 1945.  R. E. MIDDLETON  2,380,663
SIMPLIFIED BRAKE VALVE
Filed June 20, 1942  2 Sheets-Sheet 2
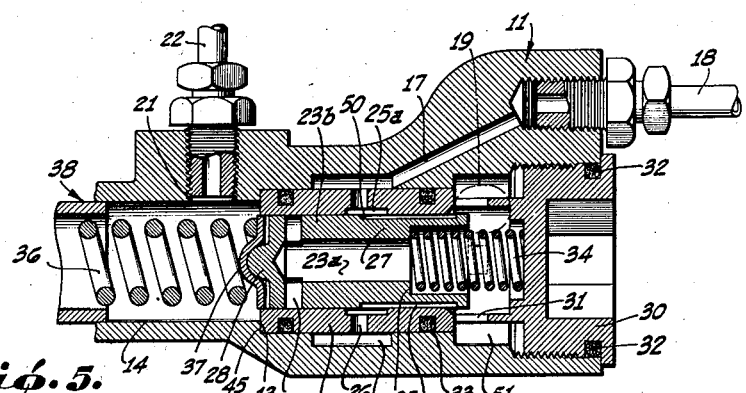
Fig. 5.
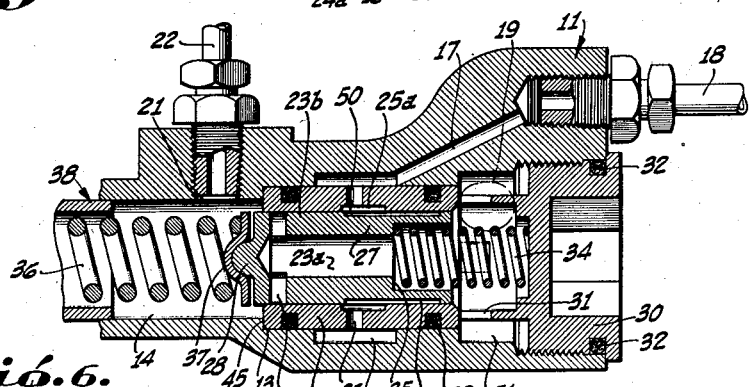
Fig. 6.
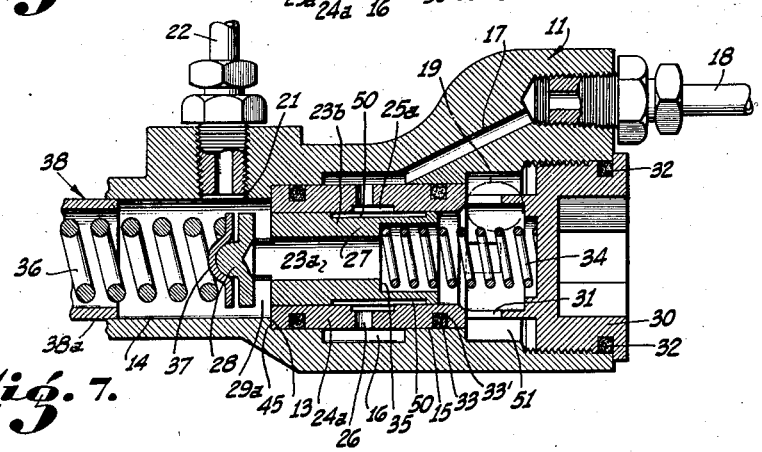
Fig. 7.
RALPH E. MIDDLETON,
INVENTOR.
BY 
ATTORNEY.

Patented July 31, 1945

2,380,663

UNITED STATES PATENT OFFICE 2,380,663

SIMPLIFIED BRAKE VALVE

Ralph E. Middleton, North Hollywood, Calif., assignor to Aireon Manufacturing Corporation, a corporation of California Application June 20, 1942, Serial No. 447,778

3 Claims. (Cl. 303—54)

This invention relates to a hydraulic brake valve and particularly to a valve for controlling the flow of fluid under pressure from a source of substantially constant fluid pressure to a hydraulic brake or other mechanism operated by fluid under pressure.

It is an object of the invention to provide in a valve of this character a means under the control of the operator for determining the pressure applied to the brake which shall be independent of the degree of pressure at the fluid pressure source.

It is another object of the invention to provide a controller for a hydraulic brake of such a character that the pressure applied to the brake shall correspond to the position of the controller and shall not be proportional to the pressure at the pressure source.

It is another object of the invention to provide a brake controlling valve mechanism in which the operative pressure is determined by and corresponds to the force applied to a lever or the like in opposition to a resiliently acting force.

It is still another object of the invention to provide a brake controlling valve having means for shutting off the pressure from a source of fluid pressure at a predetermined value, which means is responsive to the fluid pressure acting upon the brake mechanism and is also under the control of the operator so that he may vary the aforesaid predetermined pressure value in accordance with the degree of braking action required of the brakes at any time.

It is another object of the invention to provide for the accomplishment of the above objects a simplified valve construction operable to connect the source of fluid pressure with the brake mechanism by a resiliently acting force, the value of which is under the control of the operator, and which is opposed by the fluid pressure acting upon the brake mechanism.

Another object of the invention is to provide in such a slide valve construction a relatively heavy spring for opening the valve and establishing a fluid pressure connection between the pressure source and the brake mechanism, this spring acting in opposition to the pressure at the brake mechanism and a relatively weak spring acting in opposition to the heavy spring and supplementing the action of the fluid pressure at the brake mechanism to close the valve.

Further objects and advantages of the invention will be brought out in the following part of the specification.

Referring to the drawings which are for illustrative purposes only,

Figure 1:
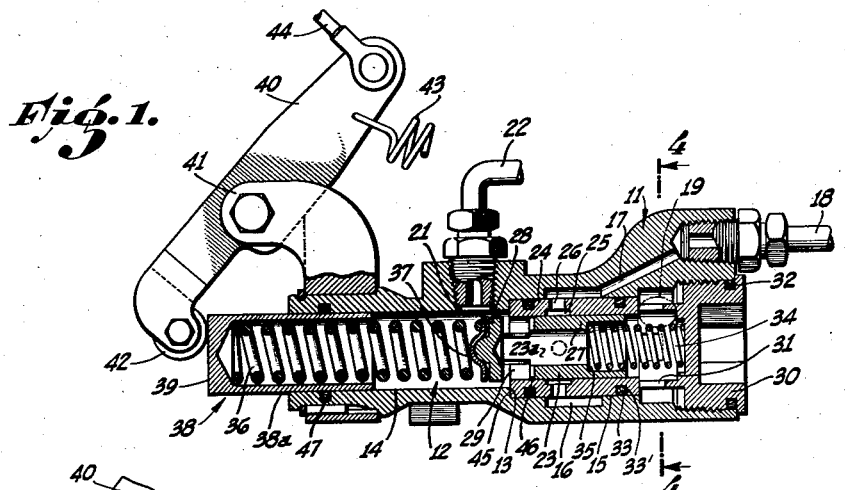
Fig. 1 is a longitudinal sectional view of a brake valve which embodies the invention, with the valve parts in a position taken during one phase in the cycle of operation of the valve.

Figs. 5, 6, and 7 are longitudinal sectional views of a brake valve embodying the invention in a modified form, showing the valve parts in three different positions respectively taken during the operative cycle.

A valve housing 11 is centrally bored to provide a cylindric chamber 12 having at the leftward end a chamber 14 of a smaller diameter and at the rightward end a chamber 15 of larger diameter, these two chambers meeting at the stepped shoulder 13. The chamber 15 is provided with an annular pressure fluid inlet port 16 formed in the wall of the housing 11, which is connected by a passage 17 to a piping 18 leading to a source of fluid under pressure. The rightward end portion of the chamber 15 is provided with a brake service port 19 formed in the wall of the housing 11, which communicates with the piping 20, the latter serving to conduct fluid under pressure to the brake cylinder of a hydraulic brake mechanism (not shown), the latter being typical of devices operable by fluid under pressure with which this invention is capable of use.

The smaller diametered cylindric chamber 14 is provided with a return or bleeder port 21, formed in the wall of the housing 11, which communicated with the terminus of a piping 22, the latter leading to the receiving reservoir or other low pressure side of the hydraulic pumping means which serves as a source of fluid under pressure.

A cylindric slide valve 23 centrally bored to provide a pressure chamber 23a reciprocates within an insert sleeve 24, which is seated in the leftward end portion of the bore 15 of the housing. This valve connects the source of fluid pressure from which fluid is conducted to the valve through the piping 18, with the brake mechanism to which fluid under pressure is conducted through the piping 20 and is designed to close the connection thus made when the pressure of the fluid delivered to the brake mechanism reaches a predetermined value.

The insert sleeve 24 has on its bore face an annular channel shaped port 25 which communicates with the annular passage or port 16 of the housing 11 through a plurality of radial passageways 26 formed in the insert sleeve 24 in registry with the annular port 16.

The rightward end of the bore chamber 15 is closed by a threaded plug 30 and the escape of fluid under pressure around the plug is prevented by means of the sealing gasket 32. Escape of fluid under pressure around the ends of the insert sleeve 24 to the annular port 16 is similarly prevented by the annular sealing means 33 carried in channels 33' in the outer face of the insert sleeve 24. The insert sleeve 24 is held in position within the housing 11 against the shoulder 13 by an inwardly projecting open work cage structure 31 integrally formed on the inner face of the plug 30. Inward movement of the plug 30 presses the insert sleeve 24 against the shoulder 13 and clamps it securely in position within the housing.

The slide valve 23 comprises an end wall or head 28 constituting a piston slidable within the bore of the insert sleeve and a skirt 27 extending in a rightward direction from the piston 28. Radial passageways or ports 29 are formed in the skirt 27, these ports 29 having a length longitudinal of the valve somewhat less than the distance between the annular port 25 and the inner or leftward end wall 45 of the insert sleeve 24.

Figure 2:
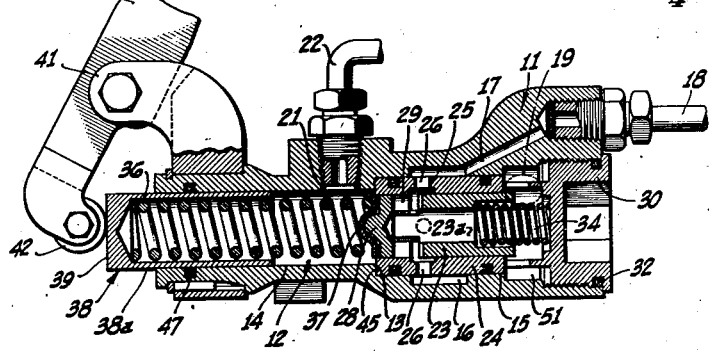
Fig. 2 is a similar view showing the valve parts in a position corresponding to another phase in the cycle of operation of the valve.
Figure 2:

A light coiled spring 34 is seated under compression between an annular shoulder 35 formed on the inner bore face of the skirt 27 and the inner or leftward face of the plug 30, serving to urge the valve 23 in a leftward direction into the position in which it is shown in Fig. 1. To move the valve 23 in a rightward direction in opposition to the action of the spring 34, and toward or through the position in which it is shown in Fig. 2, a relatively heavy coil spring 36 is disposed between a spring seat 37 positioned against the leftward face of the piston 28 and a hollow plunger 38, which is slidably mounted within the bore chamber 14 of the housing 11. The hollow plunger 38 has a cylindric wall 38a and an end closure wall 39 against the inner face of which is seated the leftward end of the spring 36. To move the plunger 38 in rightward direction to compress the spring 36 and yieldably apply force to the leftward end of the valve 23, a lever 40 is pivotally mounted upon a fulcrum standard 41 which is secured to the housing 11. The lower end of the lever 40 mounts a roller 42 which bears against the outer end of the hollow plunger 38. The upper end of the lever 40 is connected by a draw rod 44 to a suitable manually operable device (not shown) by which the lever may be rotated in an anti-clockwise direction against the action of a spring 43 to move the plunger 38 to the right through different positions corresponding to the pressures which the operator desires to apply to the brake cylinders. Leakage of fluid from the chamber 14 may be prevented by an annular sealing means 47.

When the brake valve is in the off position, as shown in Fig. 1 of the drawings, the brake service port 19 is in direct communication with the return piping 22 through the piston chamber 23a, the insert sleeve ports 29, the bore chamber 14, and bleeder port 21, the rightward face of the piston 28 at this juncture being to the left of the inner end wall 45 of the sleeve insert 24. At this position of the valve the port 25 is covered by the valve skirt 27, shutting off the brake service port 19 and the brake mechanism from the fluid pressure pump. Accordingly, the pressure in the cylinder of the brake mechanism will at this time be at substantially zero value. The light spring 34 insures holding the valve 23 in the position shown in Fig. 1.

When it is desired to apply the braking element of the brake mechanism, the operator rotates the lever 40 in an anti-clockwise direction to move the plunger 38 to the right, causing the spring 36 by reason of its resilience to yieldably apply a force to the valve 23 by which the valve is moved to the right. The piston 28 first enters the bore of the insert sleeve 24 shutting off communication between the brake mechanism and the return piping 22. Then, as the valve moves further to the right, the valve ports 29 move into initial registry with the annular port 25, as shown in Fig. 2, admitting fluid under pressure from the supply piping 18 through the valve chamber 23a and brake service port 19 to the brake cylinder, causing actuation of the brake mechanism. In order to obviate any unduly sudden application of the brake, annularly arranged small notches 46, forming extensions of the ports 29 longitudinally of the valve, are provided to effect an initial gradual opening of the port 26.

Figure 3:
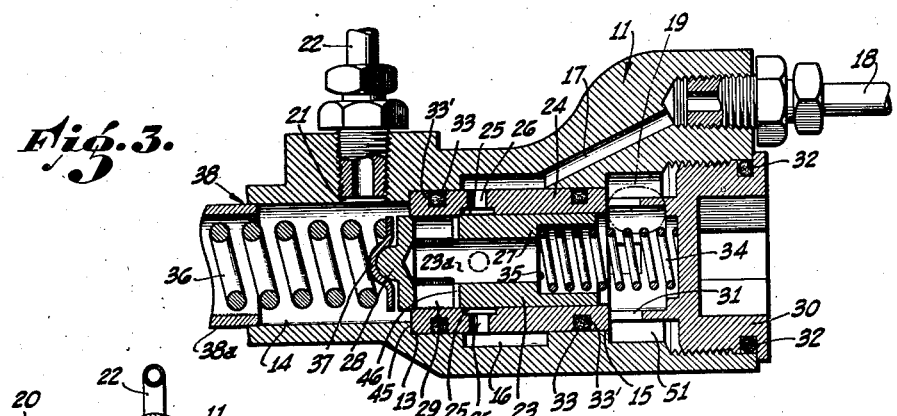
Fig. 3 is an enlarged sectional view similar to Figs. 1 and 2, showing the valve parts in a position corresponding to still another phase in the cycle of operation of the valve.
Figure 4:
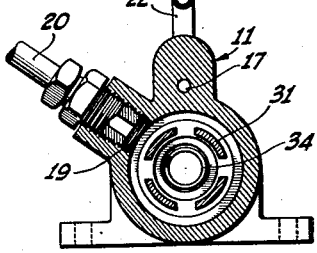
Fig. 4 is a sectional view taken as indicated by the line 4—4 of Fig. 1.

As the pressure in the brake cylinder of the brake mechanism increases, the pressure within the valve chamber 23 also increases, subjecting the piston 28 to a leftward acting force in opposition to the rightward acting force of the spring 36. The valve will then be moved in a leftward direction until the port 25 is again closed preventing any further increase in the pressure applied to the brake mechanism. Since the length of the ports 29 is less than the distance between the port 25 and the shoulder 45 of the insert sleeve, the valve 23 will remain stationary with the ports 29 closed, as shown in Fig. 3. Should there be an increase in pressure in the brake cylinder and in the chamber 23a, the valve 23 will be moved leftward from its position of Fig. 3, whereby the excess pressure fluid will be bled out through the leftward end of the sleeve 16 to the return port 21. Should there be a drop in pressure in the brake cylinder of the brake mechanism, the pressure will similarly drop in the valve chamber 23a permitting the spring 36 to again open the port 25 to whatever exent and for whatever length of time is necessary to re-establish the desired pressure in the brake cylinder, at which juncture the valve 23 will again move leftward to close the port 25. Also, should there be a small leakage from the brake mechanism, the two forces acting on the valve will come to an equilibrium with the port 26 uncovered just enough to supply fluid at a rate to offset this leakage.

The pressure at which the closing of the port 25 occurs or an equilibrium is reached depends upon the compression existing at any time in the spring 36, which is in turn proportionate to the force applied to the lever 40 or to the position at which this lever may be fixed by the operator. It is therefore evident that with a brake valve constructed in accordance with the principles of this invention, the operator may by means of the lever 40 determine the pressure available for actuation of the brake mechanism. It is also evident that this braking pressure, as thus established by the operator, will be kept at a constant value and will not in any way be proportional to the pressure at the source of supply. If greater braking action is desired, this may be accomplished by changing the position of the lever 40, which in turn changes the pressure value at which the valve 23 closes the port 25, and which is also the pressure value available for the operation of the brake mechanism.

To release the brakes, the valve parts are returned to the position shown in Fig. 1, by a clockwise movement of the lever 40.

Closing of the port 25 by the piston 28 and leakage of high pressure fluid around the piston to the bleeder port 21 is prevented by limiting rightward movement of the valve against the plug 30. It will be evident from the drawings that the rightward end of the skirt 27 contacts the plug 30 limiting further movement of the valve when the rightward face of the piston 28 is approximately in registry with the leftward end of the annular port 25.

As above stated, the relatively light spring 34 insures an opening of the valve when there is no fluid pressure in the brake cylinder. It also serves to prevent possibility of an intermittent slight reciprocatory movement of the valve when there is no fluid pressure in the brake cylinder.

That feature of the invention by which the insert sleeve 24 is made, removable from the valve housing 11, renders it possible to use a material for the insert sleeve which is capable of being machined to accurately fit the valve 23 providing a free movement of the valve in the sleeve without appreciable leakage between their engaging surfaces. Also, the sleeve is readily replaceable when worn, since it is locked in position by the nut 30 which is removable without the use of special tools.

Fig. 5 is a view similar to Fig. 1, showing a modified form of valve embodying the invention. The several parts of the valve shown in this figure, which are identical with those of the form shown in Figs. 1 to 4, are designated by the same identifying characters.

A port 29a, corresponding to port 29 of the first form of the invention, is shorter than port 29 and serves to establish communication between the valve bore and the bleeder port 21 through chamber 14. Communicating connection between the brake service port 19 and a channel shaped port 25a leading to the high pressure fluid passage 17 is provided by means of an annular row of slotted ports 50 in the rim face of the cylindric valve wall 23b, the ends of which are spaced from the ends of the valve wall.

When the slide valve is at its extreme rightward position, the cylindrical valve wall 23b thereof projects to the right into an enlarged end 51 of the housing bore chamber 12 a sufficient distance to provide communication between the rightward ends of the slotted ports 50 and the chamber 51. High pressure fluid may then flow from the source of fluid pressure through piping 18, port 17, radial ports 26, annular port 25a, slotted ports 50, chamber 51, and brake service port 19 to the brake service mechanism. At this juncture port 29a is obturated by the piston 28.

As the pressure is built up within the chamber 51 and the valve bore 23a, this higher pressure acts upon the rightward face of the piston 28 to move the valve to the left obturating the slotted ports 50. When the right ends of the slotted ports have passed the right end of the insert sleeve 24a and have moved a small distance beyond the rightward end of the insert 24a, the leftward end of the port 29a passes the leftward end of the insert 24a, establishing communication between the brake service port 19 and the bleeder port 21. It will be observed that during a very brief interval of time between the closing of the high pressure port and the opening of the bleeder port when the valve is moving to the left or between the closing of the bleeder port and the opening of the high pressure port when the valve is moving to the right, the brake mechanism is not connected with either the source of fluid pressure or the low pressure fluid receiving reservoir.

Fig. 5 shows the modified valve structure with its parts in position for connecting the fluid pressure source with the brake mechanism; Fig. 6 shows the parts in the position as the valve is moving in either direction in which both the high pressure and bleeder ports are closed; and Fig. 7 shows the valve with the parts in the position which they occupy when the bleeder port is open.

It has been found that under some conditions two valve ports, like those shown in Figs. 5, 6, and 7, in lieu of the one port which is characteristic of the form of the invention shown in Figs. 1 to 4, give superior operative performance, preventing reciprocative chattering of the valve between positions in which the fluid pressure port is partially open and partially closed.

I claim as my invention:

1. In a control device for regulating the application of fluid pressure from a source of fluid pressure to a fluid pressure operated mechanism, the combination of: a housing having a stepped cylindric chamber having two bores of different diameters, a first port toward the outer end of the larger bore leading to said mechanism, an annular second port toward the inner end of the larger bore leading to said source, and a bleeder port for said smaller bore leading to a low pressure zone; a removable closure wall for the outer end of said larger bore, said wall having an open work cage projecting inwardly of said bore; a liner for the inner end of the larger bore, said liner being of a smaller inside diameter than said smaller bore and being held against the stepped shoulder between said bores by said cage, said liner having an annularly disposed port means communicating with said annular second port; a cup shaped slide valve reciprocable in said liner disposed with its end wall toward said smaller bore and having an annularly disposed port means of a shorter length than the distance along said liner bore wall between said liner port means and the inner end of said liner; a cup shaped plunger reciprocable within said smaller bore with its end wall at its outer end; a relatively heavy helical spring seated under compression between the said end walls of said valve and plunger; a control means for adjustably positioning said plunger longitudinally of said smaller bore; and a relatively light helical spring seated under compression between said valve and said removable closure wall.

2. In a control device for regulating the application of fluid pressure from a source of fluid pressure to a fluid pressure operated mechanism, the combination of: a housing having a cylindric bore chamber of enlarged diameter at one end, a first port leading to said mechanism, a second annular port toward said one end of said bore chamber leading to said source, and a bleeder port toward the other end of said bore chamber leading to a low pressure zone; a wall member for closing said one end of said bore chamber; a hollow bored cylindric valve slidable within said bore chamber and projectible into said enlarged end thereof, the bore of said valve being in communication with said first port and being closed toward the said other end of said bore chamber to provide a piston wall exposed to the pressure within said valve bore, and said valve having a port toward said closed end and the cylindric wall of said valve having an annular row of longitudinally disposed slotted ports on its rim faces in registry with said second port and with their ends spaced from the ends of said wall, said port and slotted ports being disposed to provide as said valve moves toward said other end of said bore chamber, first projection of said slotted ports into said enlarged chamber, then obturation of said slotted ports by the bore face of said bore chamber, and thereafter registration of said port toward said closed end with said bleeder port; resilient means for yieldably moving said valve toward said one end of said bore chamber; and a control means for varying the action of said resilient means.

3. In a control device for regulating the application of fluid pressure from a source of fluid pressure to a fluid pressure operated mechanism, the combination of: a housing having a cylindric bore chamber, a first port leading from adjacent one end of said bore chamber to said mechanism, an annular second port toward said one end of said bore chamber leading to said source, and a bleeder port toward the other end of said bore chamber leading to a low pressure zone; a wall member for closing said one end of said bore chamber; a hollow bored cylindric valve slidable within said bore chamber, the bore of said valve being in communication with said first port and being closed toward the said other end of said bore chamber to provide a piston wall exposed to the pressure within said valve bore, and said valve having a first valve port toward its closed end, and a second separate valve port toward its other end, said first and second valve ports being disposed to provide as said valve moves toward said other end of said bore chamber, first a communicating connection between said first port and said second port through said second valve port, then a closing of said connection and thereafter a communicating connection between said first port and said bleeder port through said first valve port; resilient means for yieldably moving said valve toward said one end of said bore chamber; and a control means for varying the action of said resilient means.

RALPH E. MIDDLETON.